United States Patent [19]
Roberts

[11] Patent Number: 4,807,668
[45] Date of Patent: Feb. 28, 1989

[54] DRIP IRRIGATION TAPE

[76] Inventor: James C. Roberts, 1860 Jeffery Ave., Escondido, Calif. 92027

[21] Appl. No.: 124,332

[22] Filed: Nov. 20, 1987

Related U.S. Application Data

[63] Continuation of Ser. No. 14,073, Feb. 5, 1987, abandoned, which is a continuation of Ser. No. 707,082, Mar. 1, 1985, abandoned.

[51] Int. Cl.$^4$ .......................... F15D 1/14; B05B 15/00
[52] U.S. Cl. ..................................... 138/103; 138/128; 138/178; 138/42; 239/542; 239/547; 405/47
[58] Field of Search ............... 138/128, 103, 177, 178, 138/151, 156, 170, 42; 405/43–45, 47–48, 37; 239/542, 547, 145

[56] References Cited

U.S. PATENT DOCUMENTS

| | | |
|---|---|---|
| Re. 28,095 | 7/1974 | Chapin . |
| 1,761,281 | 6/1930 | Taub . |
| 3,361,359 | 1/1968 | Chapin . |
| 3,426,544 | 2/1969 | Curtis . |
| 3,549,223 | 11/1970 | Ebbe . |
| 3,613,357 | 10/1971 | Coburn . |
| 3,669,357 | 6/1972 | Overbey . |
| 3,672,345 | 6/1972 | Goodricke . |
| 3,727,345 | 4/1973 | Smith . |
| 3,736,755 | 6/1973 | Hammond et al. . |
| 3,739,522 | 6/1973 | Greenbaum . |
| 3,774,850 | 11/1973 | Zeman . |
| 3,797,754 | 3/1974 | Spencer . |
| 3,860,179 | 1/1975 | Costa . |
| 3,866,833 | 2/1975 | Shibata et al. . |
| 3,870,236 | 3/1975 | Sahagun-Barragan . |
| 3,872,621 | 3/1975 | Greenbaum . |
| 3,874,598 | 4/1975 | Havens . |
| 3,887,138 | 6/1975 | Gilead . |
| 3,887,139 | 6/1975 | Pearce . |
| 3,899,135 | 8/1975 | O'Brian . |
| 3,903,929 | 9/1975 | Mock . |
| 3,939,875 | 2/1976 | Osborn et al. . |
| 3,946,762 | 3/1976 | Green . |
| 3,988,396 | 10/1976 | Stannard . |
| 3,998,392 | 12/1976 | St. Clair . |
| 4,009,832 | 3/1977 | Tiedt ................................. 239/542 |
| 4,022,384 | 5/1977 | Hoyle et al. . |
| 4,047,995 | 9/1977 | Leal-Diaz ............................ 239/542 |
| 4,053,109 | 10/1977 | Gilead . |
| 4,061,272 | 12/1977 | Winston . |
| 4,123,006 | 10/1978 | Yukishita . |
| 4,126,998 | 11/1978 | Gilead . |
| 4,139,159 | 2/1979 | Inoue et al. . |
| 4,170,044 | 10/1979 | Steimle . |
| 4,173,309 | 11/1979 | Drori ................................. 239/542 |
| 4,177,946 | 12/1979 | Sahagun-Barragan . |
| 4,210,287 | 6/1980 | Mehoudar .......................... 239/542 |
| 4,247,051 | 1/1981 | Allport .............................. 239/542 |
| 4,285,472 | 8/1981 | Okada et al. . |
| 4,385,727 | 5/1983 | Spencer ............................. 239/542 |
| 4,473,191 | 9/1984 | Chapin .............................. 239/542 |
| 4,474,330 | 10/1984 | Langa ................................ 239/542 |
| 4,541,569 | 9/1985 | Langa ................................ 239/542 |
| 4,626,130 | 12/1986 | Chapin .............................. 239/542 |
| 4,722,759 | 2/1988 | Roberts et al. ..................... 239/542 |

Primary Examiner—James E. Bryant, III
Attorney, Agent, or Firm—Brown, Martin, Haller & Meador

[57] ABSTRACT

A plastic drip irragation tape of unitary construction is disclosed that employs a water impervious polyethylene film folded lengthwise with the edges overlapped and joined together in a heat sealed seam to form a flat flexible conduit. A narrow preformed groove along one edge defines a small secondary conduit within the seam that resists deformation to maintain a consistent controlled drip rate along the tape. Breaks in the seam at regular intervals form inlets through which irrigation water flows from the main conduit into the secondary conduit and outlets through which the water is emitted from the secondary conduit to the soil.

13 Claims, 3 Drawing Sheets

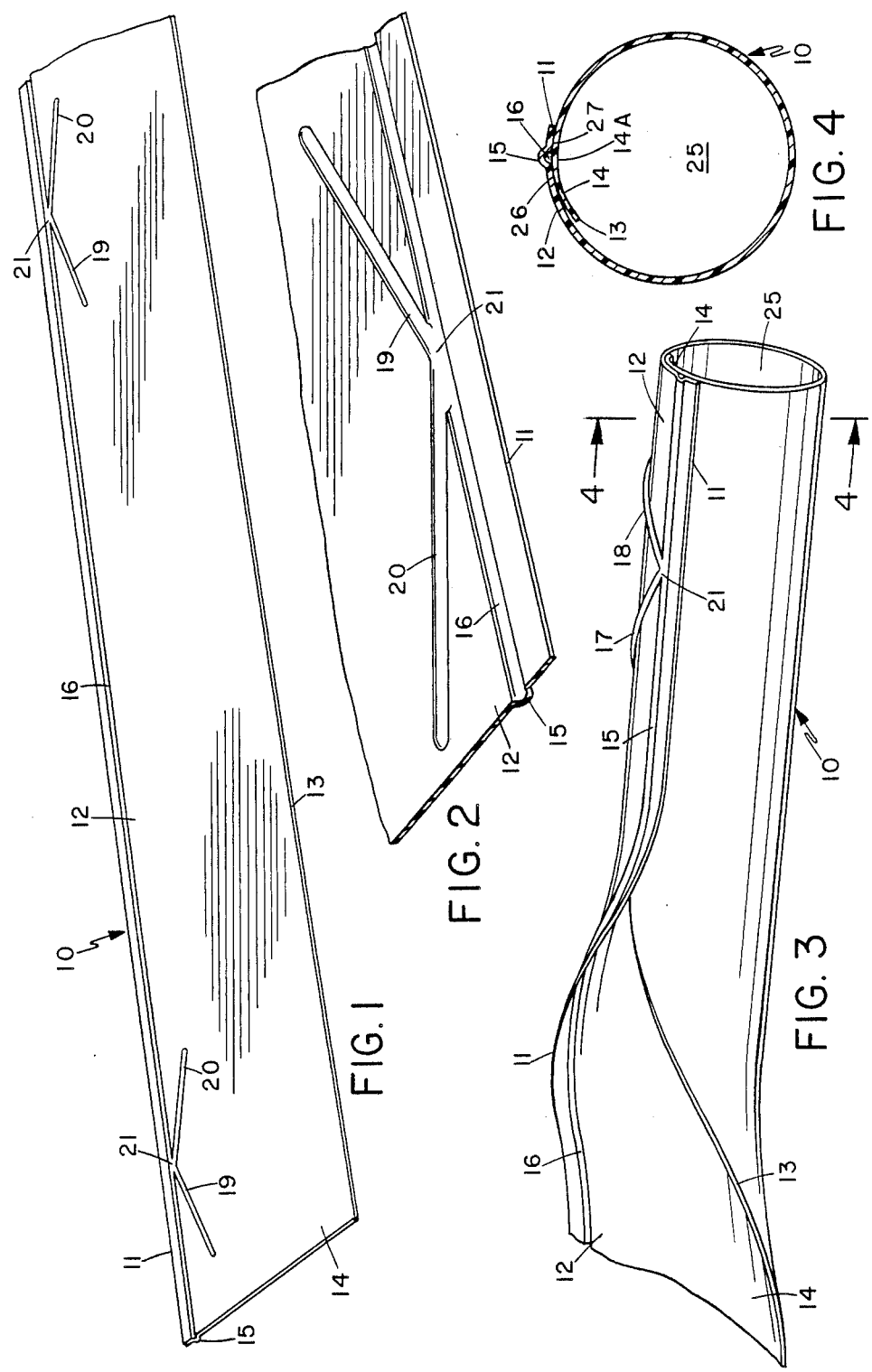

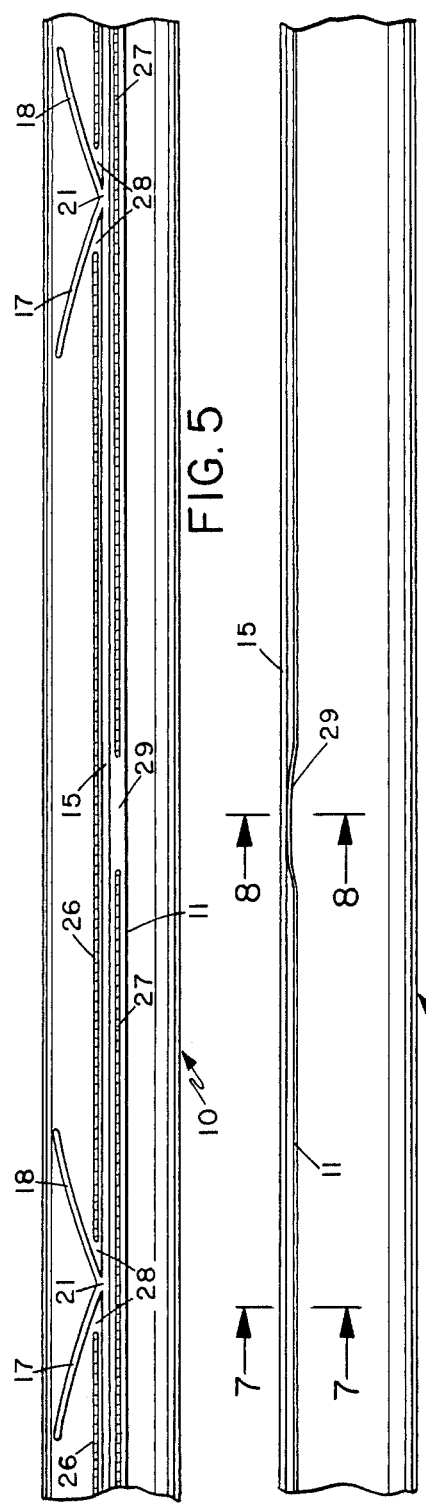

U.S. Patent  Feb. 28, 1989  Sheet 3 of 3  4,807,668
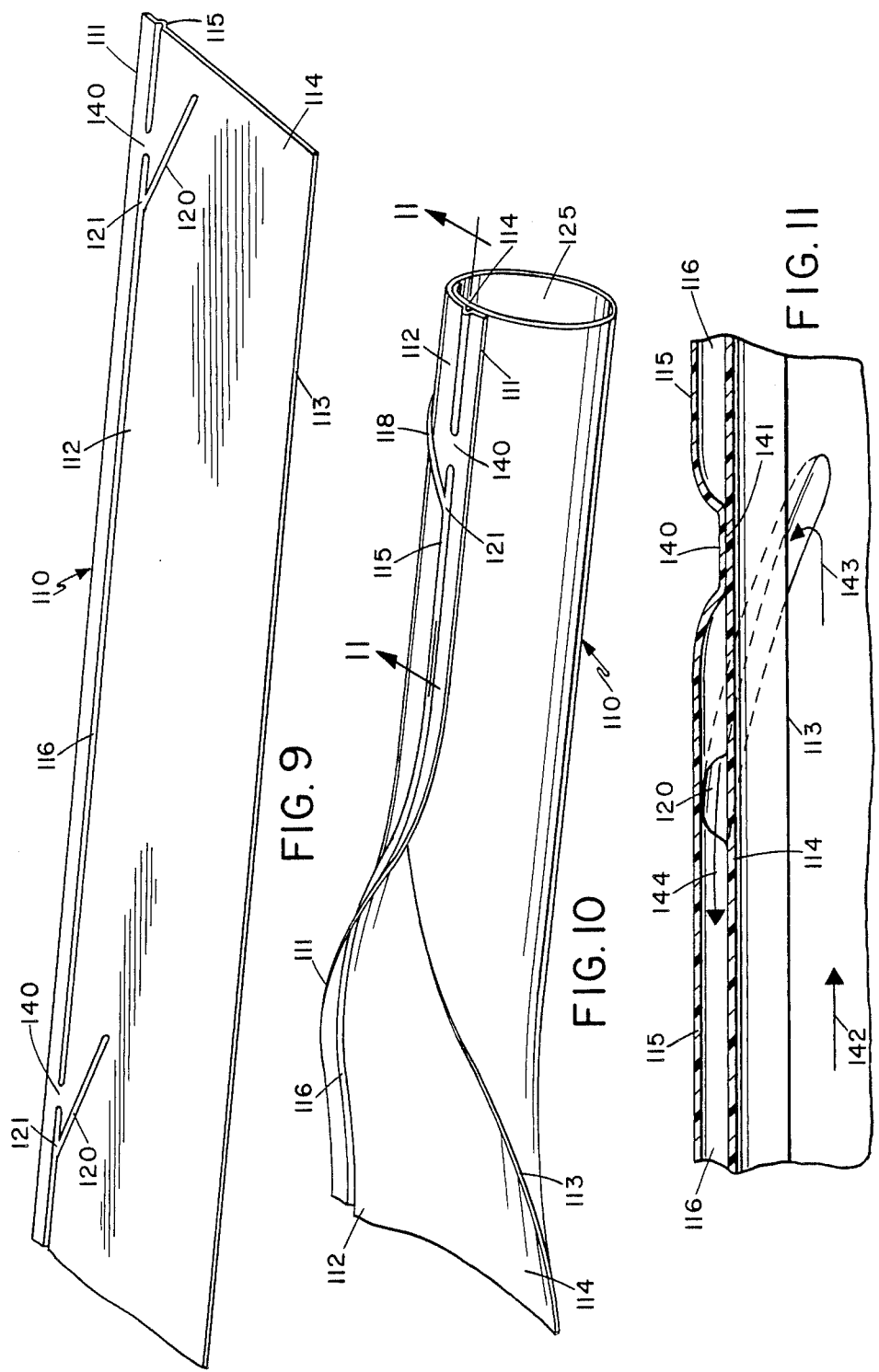

DRIP IRRIGATION TAPE

This is a continuation of application Ser. No. 014,073, filed Feb. 5, 1987 now abandoned; which is a continuation of Ser. No. 707,082, filed Mar. 1, 1985, now abandoned.

CROSS REFERENCE TO RELATED APPLICATIONS

The copending application entitled "Apparatus For Fabricating Drip Irrigation Tape" filed the same date as this application is related.

BACKGROUND OF THE INVENTION

This invention relates generally to irrigation and particularly to drip irrigation tape and its fabrication.

The drip irrigation system is far less noticeable than many of its counterparts. Instead of spraying large amounts of water over the crops, it supplies less water more effectively through lengths of tubing placed near the roots where drops of water emitted through small outlets moisten the soil just the right amount. Crops improve, salt accumulation and fertilizer loss decreases, and water is conserved.

In addition to its low profile and effective performance, this clever and inherently simple technique is easier and less expensive. As a result, it has come into such widespread use that many miles of irrigation tubing are in demand, the generally flat plastic tubing called drip irrigation tape being especially popular.

This type of tubing lies flat for easy handling. It can be rolled up on reels for transportation and to ease distribution over a field. Once water is introduced, it swells like the perforated sprinkling hose used to water the front lawn, and as water flows under pressure within, outlets along the tubing emit drops or water into the soil to water the crops at their roots where most needed and at a rate most beneficial.

Much of today's drip irrigation tape is fabricated from a thin pliable plastic strip folded lengthwise. The two edges are overlapped and joined together to form a flat hollow tape that may be on the order of one inch wide. Under pressure, it swells toward the general shape of cylindrical tubing with an inside diameter that may be about five-eighths inch. This is the main conduit for irrigation water—the main passageway for water flowing to crops under irrigation.

But unlike sprinkling hose, drip irrigation tape also employs a much smaller secondary conduit. It is usually located along the seam formed by the overlapping edges of the plastic strip and it extends along the tape adjacent the main conduit as a narrow passageway that helps reduce the rate at which water is emitted into the soil. Water supplied to the main conduit spends its energy finding its way into the secondary conduit through a series of inlets interconnecting the two, and then forcing its way along the secondary conduit to a series of outlets where it slowly trickles out drop by drop into the soil.

This is the secret of drip irrigation tape that makes it so effective—slow built-in leaks evenly spaced along its length—and the design details accomplishing this are critical to inexpensive manufacture and successful operation in a drip irrigation system. By focusing on these details, we can appreciate some of the problems in existing designs that need to be overcome.

The seam and secondary conduits are especially important. The seam is some designs, for example, is formed by joining the overlapping edges of the plastic strip together with an adhesive applied lengthwise down the tape in two fine parallel lines, the space between the two adhesive beads serving as the secondary conduit. One such design employs thin monofilament fishing line that is first dipped in adhesive and then applied between the edges to form the beads.

While these designs employ the expedient of making the secondary conduit part of the seam, they have certain drawbacks. In the first place, the adhesive beads constitute additional material and additional steps in the fabrication process. They also must be accurately applied and carefully controlled to maintain dimensioning that will achieve a consistent drip rate along the tape.

Furthermore, the secondary conduit is often prone to collapse due to an apparent electrostatic affinity of the overlapping edges for each other. Whether in manufacturing, through handling, or while buried in the middle of a field under irrigation, the secondary conduit often becomes deformed so that the overlapping edges of the plastic strip touch and stick together in the gap between the adhesive beads. When this happens, the secondary conduit becomes blocked and the tape malfunctions.

Other designs have their drawbacks also. For instance, the needle holes of a stitched seam used as outlets in one design and the laser-cut slits in another often become blocked by soil or particulate material in the irrigation water and the tape malfunctions. In addition, fabrication is more involved.

Thus, while existing designs generally employ a two-conduit approach to achieve a slow controlled drip rate, they have certain specific drawbacks related to fabrication, operation, and reliability.

Consequently, it is desirable to have a new and improved drip irrigation tape that alleviates these concerns—one easily and inexpensively manufactured, able to achieve a consistent drip rate along its length, and less susceptible to malfunctioning.

SUMMARY OF THE INVENTION

This invention recognizes the problems associated with existing designs and provides an improved drip irrigation tape with the desired attributes.

A tubing structure constructed in accordance with the invention employs a strip of flexible material, such as a thin plastic film, that is folded lengthwise with the two longitudinal edge portions of the strip overlapped and joined together to form a first conduit.

One of the edge portions is shaped to define a groove extending lengthwise along the strip. The other edge portion is joined to it on opposite sides of the groove to form a longitudinally-extending seam in which the groove defines a secondary conduit that is resistant to deformation.

Means are included for maintaining these generally collinear conduits in fluid communication to enable fluid supplied to the first conduit to flow into the secondary conduit. This may be a series of breaks in the seam at regular intervals. Means are also included for enabling the fluid to flow from the secondary conduit to the exterior of the tape at spaced apart locations. This may be another series of breaks in the seam at regular intervals.

The groove is dimensioned to impede fluid flowing through the secondary conduit as a means of achieving a desired drip rate along the tape exterior without relying on outlet dimensioning. This feature combined with resistance to deformation and ease of fabrication alleviates many concerns normally associated with drip irrigation tape.

The above and other objects and advantages of the invention will become more fully apparent upon reading the detailed description in conjunction with the accompanying drawings.

BRIEF DESCRIPTION OF THE DRAWINGS

FIG. 1 of the drawings is a perspective view of an unfolded portion of the flexible strip used in the illustrated embodiment of the tubing structure, showing the preformed edge portion prior to folding;

FIG. 2 is an enlarged detail of the flexible strip showing the junction of the groove with a pair of inlet channels;

FIG. 3 illustrates the folding of the flexible strip into the tubing;

FIG. 4 is an enlarged sectional view taken on line 4—4 of FIG. 3;

FIG. 5 is a top plan view of a portion of the completed tubing;

FIG. 6 is a side elevation view of the tubing;

FIG. 7 is an enlarged sectional view taken on line 7—7 of FIG. 6;

FIG. 8 is an enlarged sectional view taken on line 8—8 of FIG. 6;

FIG. 9 is a perspective view of an unfolded portion of the flexible strip used in alternate embodiment of the tubing structure;

FIG. 10 illustrates the alternate embodiment partially folded; and

FIG. 11 is an enlarged sectional view of a portion of the alternate embodiment taken of line 11—11 of FIG. 10.

DETAILED DESCRIPTION

An unfolded portion of the flexible strip used in the illustration embodiment of the drip irrigation tape is shown in FIGS. 1 and 2 where it is referred to generally by reference numeral 10 and shown to include a thin flexible film of water impervious material, such as polyethylene. The strip is suitably dimensioned for folding into a piece of tubing, the illustrated embodiment being on the order of 2⅜ inches wide and 4-25 mils thick. It is folded and the edges joined together in the finished tubing to form a first conduit, the main conduit through which water flows to crops under irrigation.

Adjacent longitudinally-extending edge 11 or strip 10 is first edge portion 12 that extends lengthwise along the strip. And adjacent longitudinally-extending edge 13 of strip 10 is second edge portion 14 which also extends lengthwise along the strip. One of these edge portions is preformed with a groove while the other is retained relatively flat.

First edge portion 12 is preformed so that preformed portion 15 defines groove 16 extending lengthwise along the strip. This may be accomplished by suitable means such as heating the strip until it is formable (around 400 degrees fahrenheit for the polyethylene of the illustrated embodiment) and pressing it between rollers that are shaped to preform the groove into the first edge portion. The strip is then cooled with a preformed groove that is resistant to deformation remaining.

The illustrated embodiment is also preformed in a similar manner to define pairs of inlet channels at spaced apart locations along the strip. Inlet channels 19 and 20 are two such channels. They are defined by preformed portion 18 (FIG. 3), and they intersect groove 16 of the illustrated embodiment at junctions suitably spaced along the strip, the junctions designated reference numeral 21 being representative and spaced at one-foot intervals (FIGS. 1 and 2). Like groove 16, these inlet channels are dimensioned to provide a slow flow of water, those of the illustrated embodiment having a generally semicircular shape with a radius on the order of 50 mils. The inlet channels may be slightly larger than groove 16, and they serve with other features of the finished tubing as means for maintaining the first conduit in fluid communications with a secondary conduit defined by groove 16.

The manner in which strip 10 is folded lengthwise to form the tubing structure is illustrated in FIGS. 3 and 4. The tubing structure usually lying generally flat after folding, although it is shown circular for the purposes of illustration. First edge portion 12 and second edge portion 14 of the folded strip overlap to form first conduit 25, the main conduit or passageway for irrigation water. The folding may be accomplished by suitable known means such as passing the strip through a folding device that rolls one edge portion up over the other edge portion to obtain the configuration illustrated in FIGS. 3 and 4.

With the strip folded lengthwise, the two edge portions are joined together on opposite sides of groove 16 by suitable means such as heat sealing. This forms a seam extending lengthwise down the tubing in which groove 16 defines a secondary conduit. The heat sealing may be accomplished by pressing the two edge portions together on either side of the groove while applying sufficient heat to cause the two edge portions to bond together (around 400 degrees fahrenheit for the polyethylene of the illustrated embodiment). Suitable means such as passing the folded strip between heated rollers configured to apply opposing pressure to the two edge portions along opposite sides of the groove may be employed to produce the heat sealed seam.

The sectional view of FIG. 4 illustrates the heat sealed seam of the illustrated embodiment. It includes heat sealed portion 26 extending along one side of groove 16 and heat sealed portion 27 extending along the opposite side of the groove. As shown in FIGS. 4, 5, 7, and 8, the heat seal lines 26 and 27 are spaced outwardly from the outer side edges of the groove or indentation 16 to leave a small gap on each side of the conduit, where the overlapping edge portions are in face to face contact but are unconnected. The second edge portion covers the groove so that the groove defines a secondary conduit within the seam extending lengthwise down the tape. This secondary conduit impedes the flow of water to achieve a slow drip rate that may be, for example, on the order of 0.1 to 0.6 gallons-per-minute per one hundred feet of tubing.

The invention includes inlet means for maintaining fluid communications between the first conduit and the secondary conduit at a series of spaced apart locations along the secondary conduit. This is accomplished in the illustrated embodiment by a series of breaks in the seam, namely breaks 28 in heat sealed portion 26, that define a series of inlet ports. These breaks are discontinuities in heat sealed portion 26 (areas where the heat seal is omitted) positioned adjacent junction 21 (FIG. 5). They allow water to flow down inlet channels 17 and 18 into the secondary conduit fluid formed by groove 16.

The invention also includes outlet means for fluid communications between the secondary conduit and a series of spaced apart locations along the exterior of the tubing structure. This is accomplished in the illustrated embodiment by another series of breaks in the heat sealed seam, namely breaks 29 in heat sealed portion 27, that define a series of outlet ports (FIG. 5). These breaks may be spaced evenly between the inlet ports defined by breaks 26, and they allow water that has entered the secondary conduit defined by groove 16 to flow slowly from the secondary conduit to the exterior of the tubing structure. Breaks on the order of ¾-inch long are employed in the illustrated embodiments although other sizes are satisfactory. FIG. 6 shows edge 11 slightly raised in the area of break 29 to illustrate the outlet port.

Further details of the inlet ports defined by breaks 28 are shown in FIG. 7. Depression 27A represents a slight deforming of edge portion 12 caused by the application of pressure to form heat sealed portion 27. A corresponding depression adjacent heat sealed portion 26 is not shown in FIG. 7 since this portion of the seam is broken by break 28. Each break 28 in the heat sealed seam allows water to pass in the direction illustrated by arrow 30 between first edge portion 12 and second edge portion 14. This enables water to flow as down the inlet channels into the secondary conduit defined by groove 16.

As the second edge portion flexes in the area designated 14A toward edge portion 12 under pressure of water within the main conduit (FIG. 7), the passageway into and along the secondary conduit is slightly decreased in size and the rate of water flow correspondingly decreased. This achieves an automatic throttling effect that regulates the flow of water to maintain a steady drip rate from the secondary conduit even though the pressure of water in the main conduit varies, variance over a range from about 5 to 15 pounds-per-square-inch being typical.

The details of the outlet ports defined b breaks 29 are similar (FIG. 8). Like depression 27A in FIG. 7, related to heat sealed portion 26. And each break 29 in the heat sealed seam enables first edge portion 12 and second edge portion 16 to separate so that water can trickle out of the secondary conduit defined by groove 16. Water is thereby emitted in the direction illustrated by arrow 31.

The finished tubing may be buried adjacent rows of crops, lengths up to ⅛-mile or more being suitable. Water pumped into one end of the tubing flows along the tubing, some entering the secondary conduit at each subsequent inlet port. Water then flows from the inlet ports along the secondary conduit to the outlet ports where it is emitted into the soil at a substantially consistant rate along the tubing.

Thus, the drip irrigation tape of this invention employs the expedient of making the secondary conduit part of the seam. But unlike other drip irrigation tape, this invention does so with a strip of material having a preformed groove extending along one edge that resists deformation. The preformed groove resists external forces tending to collapse it as well as electrostatic forces tending to pull the two edge portions together.

In addition, the heat sealed seam of one embodiment employs breaks in the seam to define inlet passageways and outlet passageways at spaced apart locations along the tape. These passageways can be easily and inexpensive fabricated with the preformed groove and neat sealed seam to achieve a controlled drip rate along a length of tubing that is not dependent on outlet port size and less prone to malfunction.

Modifications within the inventive concepts of this invention include those illustrated in the alternate embodiment of FIGS. 9–11. Reference numerals in these figures are increased by 100 over those designating similar parts in FIGS. 1–8. The alternate embodiment illustrated in these figures employs only one inlet channel at each unction rather than the pair of inlet channels, channels 19 and 20 in FIGS. 1–3. Inlet channels 120 (FIGS. 9–11), formed by preformed portions 118, intersect groove 116 at junctions 121 to define the inlets. These inlets maintain fluid communications between first conduit 125 and the second conduit defined by groove 116 much like the inlets in the embodiment of FIGS. 1–8.

But there is a difference in the vicinity of each junction 121. This difference is the secondary conduit divider, divider 140, formed by joining first edge portion 112 to second edge portion 114 in joint 141 slightly downstream from each junction 121. Dividers 140 are formed adjacent each junction 121 in this position by crushing preformed portion 115 during heat sealing, or by omitting groove 116 in this area during the shaping of first edge portion 112 with the two edge portions being then joined together in joint 141 to block the secondary conduit adjacent the junctions.

This divides the secondary conduit into segments that are the general length of the interval between junctions. Water entering the secondary conduit through any particular inlet channel can only flow out of an outlet that is located along the corresponding segment of the secondary conduit. By locating just one outlet along each segment near the end of the segment opposite the inlet channel, water flow can be more precisely controlled. In addition, the path the water takes along the secondary conduit can be lengthened in this way so that secondary conduit size can be increased for the same drip rate. Furthermore, with the inlet channel inclined, as illustrated, relative to the direction of water flow in the main conduit (the direction of water flow being illustrated by arrow 142 in FIG. 11), any particulate material in the water tends to be swept past the inlet channel instead of flowing back into the inlet with water following the path of arrows 143 and 144. Hence, this modification in the design provides additional benefits.

As various changes may be made in the form, construction, and arrangement of the procedures and parts described herein, without departing from the spirit and scope of the invention and without sacrificing any of its advantages, it is to be understood that all matter herein is to be interpreted as illustrative and not in any limiting sense.

What is claimed is:

1. A tubing structure, which comprises:
  a flat strip of flexible material having a first longitudinally extending side edge portion and a second longitudinally extending side edge portion, the side edge portions having flat faces and the first edge portion being pre-shaped to define an indented groove in its flat face that extends lengthwise along the strip, the strip being folded lengthwise with the first edge portion and the second edge portion overlapping to form a first conduit, and the first edge portion and the second edge portion being joined together along spaced seal lines extending along opposite sides of the groove to form a seam in which the groove defines a secondary conduit of depth equal to the depth of the groove, each seal line being spaced outwardly from the respective adjacent side edge of the groove;

inlet means for maintaining fluid communications between the first conduit and the secondary conduit at a series of spaced apart locations along the secondary conduit; and outlet means for maintaining fluid communications between the secondary conduit and a series of spaced apart locations along the exterior of the tubing structure.

2. The structure recited in claim 1 wherein the second edge portion is joined to the first edge portion by heat sealing.

3. The structure recited in claim 1 wherein the inlet means includes a series of breaks in the seam that define a corresponding series of inlet ports.

4. The structure recited in claim 1 wherein the outlet means includes a series of breaks in the seam that define a corresponding series of outlet ports.

5. The structure recited in claim 1 which includes means for limiting the rate at which a fluid supplied to the first conduit flows from the secondary conduit.

6. The structure recited in claim 5 wherein the limiting means includes the second edge portion of the strip being shaped and dimensioned to flex and decrease the size of the secondary conduit in response to the pressure of a fluid in the first conduit.

7. The structure recited in claim 1 wherein the first edge portion is shaped to define an inlet channel that intersects the groove at a break in the seam.

8. The structure recited in claim 7 wherein the channel is inclined away from the groove in a direction selected for water to flow through the first conduit.

9. The structure recited in claim 7 wherein the first edge portion is shaped to define a pair of inlet channels of each of a series of breaks in the seam.

10. The structure recited in claim 1 wherein the secondary conduit is divided into segments.

11. The structure recited in claim 10 wherein the segments are substantially the same length as the distance between the inlet means.

12. The structure recited in claim 4 wherein the outlet of the outlet ports is larger than the channel in the secondary conduit.

13. The structure recited in claim 1, wherein the first and second edge portions are joined together in face to face contact along opposite sides of the groove.

* * * * *